(12) United States Patent
Vendrow et al.

(10) Patent No.: US 8,787,367 B2
(45) Date of Patent: Jul. 22, 2014

(54) USER PARTITIONING IN A COMMUNICATION SYSTEM

(75) Inventors: Vlad Vendrow, Redwood Shores, CA (US); Vladimir Shmunis, South Lake Tahoe, CA (US); Vadim Zhuk, Foster City, CA (US); Dmitriy Alexandrovich Solovey, San Jose, CA (US)

(73) Assignee: RingCentral, Inc., San Mateo, CA (US)

( * ) Notice: Subject to any disclaimer, the term of this patent is extended or adjusted under 35 U.S.C. 154(b) by 207 days.

(21) Appl. No.: 12/957,125

(22) Filed: Nov. 30, 2010

(65) Prior Publication Data

US 2012/0134355 A1 May 31, 2012

(51) Int. Cl.
*H04L 12/28* (2006.01)

(52) U.S. Cl.
USPC .......................................... 370/389

(58) Field of Classification Search
USPC ........................................... 370/389, 395.31
See application file for complete search history.

(56) References Cited

U.S. PATENT DOCUMENTS

| 7,668,180 B2 * | 2/2010 | Ben-David | 370/400 |
| 2003/0005350 A1 * | 1/2003 | Koning et al. | 714/4 |
| 2006/0036725 A1 * | 2/2006 | Chand | 709/223 |

* cited by examiner

*Primary Examiner* — Man Phan
*Assistant Examiner* — Kevin Lee
(74) *Attorney, Agent, or Firm* — Fish & Richardson P.C.

(57) ABSTRACT

Systems and methods for routing an incoming service request to one of a plurality of pod units are described. A communication system can be provided that includes a plurality of pods each having a first pod serving a first subset of user accounts associated with a hosted PBX system. The first pod can include a first pod unit in a first data center and a second pod unit in a second data center. A global user directory (GUD) can be used to store a plurality of user keys that are mapped to the plurality of pods. A router can be provided to identify a user key from an incoming service request, query the GUD to identify the first pod as being associated with the user key, and route the incoming service request to one of the first and second pod units.

21 Claims, 13 Drawing Sheets

US 8,787,367 B2

USER PARTITIONING IN A COMMUNICATION SYSTEM

BACKGROUND

In a hosted communication system designed with a database-centric architecture, telecommunication servers are generally provided with a single database. These telecommunication servers may provide voice, facsimile, text, data, and other services to users having accounts on the hosted communication system. Account information for these users can be stored in the single database. Account information may include phone numbers for communication devices served by the telecommunication servers, email addresses, geographical addresses, billing information, account configuration preferences and settings, and other similar contact and account information for a user.

A single database design allows the telecommunication servers to easily share data and obtain consolidated information for the users. However, a system that relies upon a single database is entirely dependent upon the database. When the database fails or is otherwise unavailable, the system as a whole may fail as well.

SUMMARY

In some implementations, a communication system can include a plurality of pods. The plurality of pods can include a first pod serving a first subset of user accounts in a hosted PBX system. The first pod can include a first pod unit in a first data center and a second pod unit in a second data center. The first pod unit can include a first communication server that can serve the first subset of user accounts in the hosted PBX system, and the second pod unit can include a second communication server that can serve the first subset of user accounts in the hosted PBX system. A global user directory (GUD) can be provided for storing a plurality of user keys, and the plurality of keys can be mapped to the plurality of pods. A router can be provided and configured to be in communication with the GUD and a network. The router can extract a user key from an incoming service request, query the global user directory to identify, for example, the first pod as being associated with the user key, and route the incoming service request to one of the first and second pod units of the first pod.

In some implementations, a plurality of user keys can be stored in a global user directory (GUD). The plurality of user keys can be mapped to a plurality of pods, each pod serving a subset of user accounts in a hosted PBX system. An incoming service request can be received from a source communication device, and a user key can be extracted from the incoming service request. The GUD can be queried to identify a pod mapped to the extracted user key, and the incoming service request can be routed to one of a plurality of pod units associated with the identified pod. Each pod unit can be located in a different data center, and each pod unit can serve the source communication device.

DETAILED DESCRIPTION

Partitioning a communication system into user subsystems can improve the robustness and scalability of the entire system. As will be discussed in greater detail below, changes, fixes, and improvements can be made to one or more subsystems concurrently or sequentially without subjecting the entire communication system to unnecessary risk.

User Partitioning into Pods

Figure 1A:
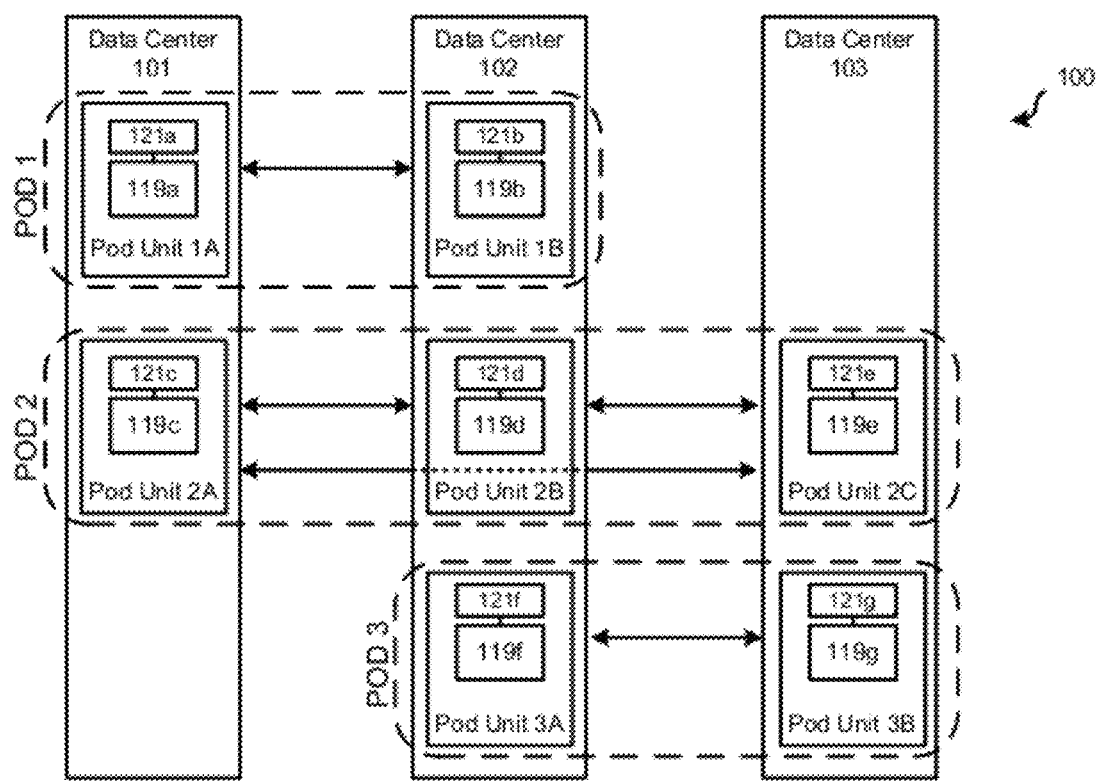
FIG. 1A shows an example of a communication system implemented with user partitioning.

FIG. 1A shows an example of a communication system 100 implemented with user partitioning. The communication system 100 can be, for example, a hosted private branch exchange (PBX) system, which can also be referred to as a virtual PBX, a cloud-based PBX, an internet telephony system, or an Internet Protocol (IP) PBX. Unlike a premise-based PBX, which requires PBX equipment to be physically located on or near the user premises where the PBX services are to be provided, a hosted PBX can provide PBX communication services over the Internet, including services such as, without limitation, voice over IP (VOIP), facsimile over IP (FOIP), call forwarding, voicemail, web-based online account management, and other similar PBX functions. As shown in FIG. 1A, the communication system 100 can include data centers 101, 102, and 103. Each data center can be a point of presence that can include one or more servers, routers, switches, and network connections necessary to support the communication system 100. Each data center can be located in a same or different geographical location or region. While only three data centers are shown in FIG. 1A, the communication system 100 can include any number of data centers greater (e.g., four data centers) or less (e.g., two data centers) than those shown. Users of the communication system 100 (or subscribers) have an account on the communication system 100.

The communication system 100 can include three user pods ("pods"); namely, a first pod (pod 1), a second pod (pod 2), and a third pod (pod 3). In some implementations, a pod can include a logical group of two or more pod units, where each pod unit of a pod can be situated in a different data center. Each pod can serve a different subset of user accounts of the communication system 100. Pod 1 can include pod unit 1A in data center 101, and pod unit 1B in data center 102. Similarly, pod 2 can include pod unit 2A in data center 101, pod unit 2B in data center 102, and pod unit 2C in data center 103. Pod 3 can include pod unit 3A in data center 102, and pod unit 3B in data center 103. While only three pods are shown in FIG. 1A, the communication system 100 can include any number of pods greater (e.g., four pods) or less (e.g., two pods) than those shown. In some implementations, there may be more than a single pod unit from a pod in the same data center.

Each pod unit 1A/1B, 2A/2B/2C, and 3A/3B can serve the same subset of users as the other pod units within a same pod. Each pod unit 1A/1B, 2A/2B/2C, and 3A/3B can include a communication server 119a-119g configured to provide substantially the same services to the same subset of users as the other pod units within the same pod. For example, pod unit 1A can include a communication server 119a in data center 101 and pod unit 1B can include a communication server 119b in data center 102. Pod unit 1A and pod unit 1B belong to the same pod, so communication servers 119a-119b provide substantially the same services to the same subset of users. As another example, pod unit 2A can include a communication server 119c in data center 101, pod unit 2C can include a communication server 119d in data center 102, and pod unit 2C can include a communication server 119e in data center 103. Pod unit 2A, pod unit 2B, and pod unit 2c belong to the same pod, so communication servers 119c-119e provide substantially the same services to the same subset of users. As yet another example, pod unit 3A can include a communication server 119f in data center 102, and pod unit 3B can include a communication server 119g in data center 103. Pod unit 3A and pod unit 3B belong to the same pod, so communication servers 119f-119g provide substantially the same services to the same subset of users.

Each pod unit 1A/1B, 2A/2B/2C, and 3A/3B also can include an account database 121a-121g configured to support the respective communication servers 119a-119g for the subset of users. For example, pod unit 1A can include an account database 121a in data center 101 and pod unit 1B can include an account database 121b in data center 102. As another example, pod unit 2A can include an account database 121c in data center 101, pod unit 2B can include an account database 121d in data center 102, and pod unit 2C can include an account database 121e in data center 103. As yet another example, pod unit 3A can include an account database 121f in data center 102, and pod unit 3B can include an account database 121g in data center 103. In some implementations, each account database 121a-121g can store configuration details and other information regarding each user's account. Additional details regarding the structures and functions of the pod units 1A/1B, 2A/2B/2C, and 3A/3B will be described below.

As shown in FIG. 1A, the pods 1-3 and pod units 1A/1B, 2A/2B/2C, and 3A/3B can be arranged in a variety of ways. Each pod 1-3 can include, for example, two pod units. but a pod 1-3 need not provide one or more pod units in every data center 101-103. For example, pod 1 can include pod units in data center 101 and data center 102, but not in data center 103. As another example, pod 3 can include pod units in data center 102 and data center 103, but not in data center 101. If desired, a pod 1-3 also can include more than two pod units across more than two data centers. For example, pod 2 can include pod units in all three data centers 101-103.

Figure 1B:
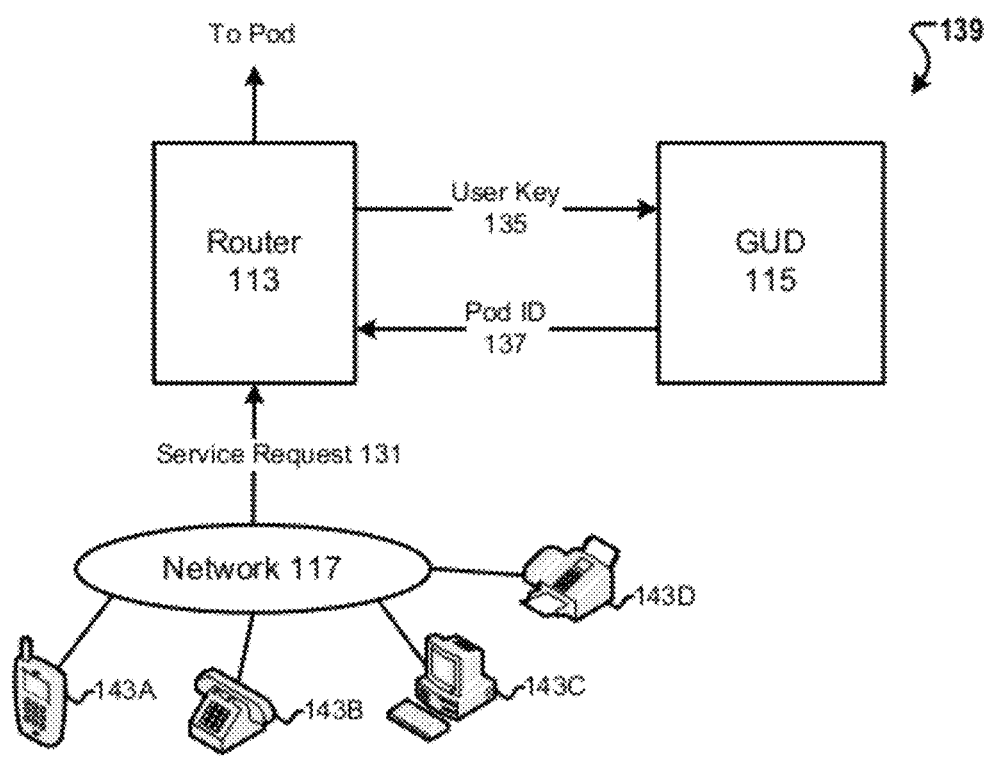
FIG. 1B shows an example of a routing subsystem.

FIG. 1B shows an example of a routing subsystem 139. In some implementations, each data center 101-103 in the communication system 100 can include a routing subsystem 139. As shown in FIG. 1B, the routing subsystem 139 can include a router 113 coupled to a network 117 and a global user directory (GUD) 115. The routing subsystem 139 can receive calls from various communication devices 143A-143D. The communication devices can include a cellular phone 143A, a landline phone 143B, a computer 143C, and a facsimile (fax) machine 143D. The landline phone 143B can include plain old telephone service (POTS) phones and voice-over-Internet Protocol (VOIP) phones. The computer 143C can be installed with telephony software to perform functions of a phone. The computer 143C can also be installed with other software (e.g. a web browser) which allows it to connect as a client to the communication servers 119 of the pod units 1A/1B, 2A/2B/2C, and 3A/3B. Other communication devices that are not shown can also be used as the communication devices 143A-143D, such as computer tablets and other personal digital devices.

A service request 131 can originate from a source device (e.g., one of the communication devices 143A-143D or other similar electronic devices), and can be routed through the network 117, where the service request 131 can be received by the router 113. Though not illustrated, the service request 131 can be routed through other provider networks (e.g. cellular networks, PSTN, wireless networks, etc.) and gateways before reaching the network 117. The network 117 can be a packet-based network, such as the Internet or other Internet Protocol (IP) based networks. The service request 131 can include a request for voice, facsimile (fax), video, text, email, web browsing, or data services from the communication system 100. In some implementations, the service request 131 can be formatted according to a packet-based protocol. In some implementations, the service request 131 also can be formatted as a request according to the Session Initiation Protocol (SIP), the Hypertext Transfer Protocol (HTTP), an email protocol (e.g. Simple Mail Transfer Protocol (SMTP), Post Office Protocol 3 (POP3), or SOAP (which previously stood for Simple Object Access Protocol).

For example, the service request 131 can be a phone call or a fax from a source device to a user of the communication system 100. The service request 131 can include, for example, a phone or a fax number associated for the user account that the phone call or fax is directed to. The service request 131 can also be a request for online worldwide web services from a user. For example, a user can log in to an online account which can show billing information, am activity log, any messages sent and received, and other account information on a webpage accessible to the user. The service request 131 can include, for example, an account login name for the user account that the user is trying to access. The service request 131 can be an email from a source device to a user of the communication system 100. The service request 131 can include, for example, an email address for the user account that the email is directed to.

The router 113 can identify (e.g., through extraction) a user key 135 from the service request 131. The user key 135 can include an identifier that uniquely identifies a user account associated with service request 131. For example, the user key 135 can include a unique user or account identifier. The user key 135 can also include unique information associated with the user account, such as an email address, a communication device identifier, or other information.

The router 113 can query the GUD 115 to determine which pod 1-3 should service the service request 131. In response, the GUD 115 can return a pod identifier 137 to the router 113. The pod identifier 137 can identify the pod that provides services to the user account associated with the service request 131. The router 113 can then route the service request 131 to a pod unit associated with the pod identified by the GUD 115.

Once the service request 131 is routed to the pod unit associated with the pod identified by the GUD 115, the communication server 119 associated with the pod unit to which the service request 131 is routed can provide the requested services to the source communication device 143A-143D. As discussed above, the service request 131 can include a request from a source communication device 143A-143D to establish a communication session (e.g. voice, video, text, data) with a destination communication device associated with the user account. For example, the service request 131 can include a facsimile transmission (e.g. from source communication device 143D) sent to or received from the user. As another example, the service request 131 can include a request to access a webpage (e.g., an HTTP request) from a web browser or other client on the communication device 143A-143D. Other services can also be offered by each individual communication server 119.

As will be discussed in greater detail below, user partitioning of the communication system 100 can be implemented to segment the communication servers 119 and supporting account databases 121 into one or more pods that serve a subset or subsets of users. Each pod unit can include, for example, one other pod unit within the same pod that provides substantially the same services to the same subset of users, through the associated communication server(s) 119. Implementing user partitioning allows the communication system 100 to operate with more than one account database 121 so that when one of the account databases 121 becomes unavailable, the communication system 100 can fail over to another account database 121 to prevent disruptive services. For example, if an account database 121 in a pod unit were to fail or to go offline, another pod unit in the same pod can take over the services of the failed account database 121.

Exemplary Communication System with User Partitioning

Figure 2:
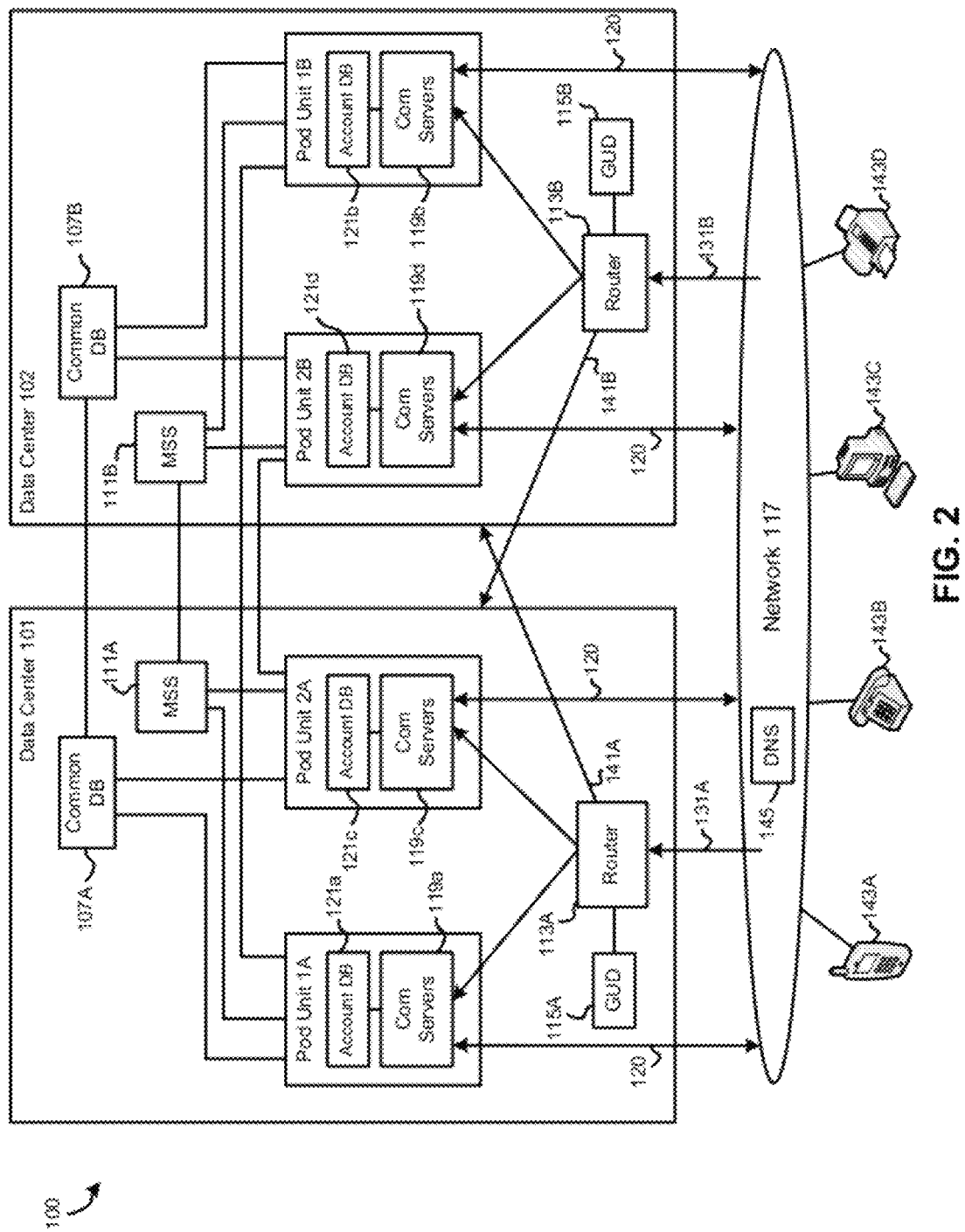
FIG. 2 shows various exemplary components of the communication system shown in FIG. 1A.

FIG. 2 shows various exemplary components of the communication system 100 shown in FIG. 1A. Specifically, FIG. 2 shows the various interconnections within and between the data center 101 and data center 102. Both data center 101 and data center 102 can be in communication with the network 117. Service requests from various communication devices 143A-143D also can be routed through the network 117 to either or both of the data center 101 and data center 102. Though only two data centers are illustratively shown in FIG. 2, the communication system 100 can include any number of data centers. Further, while the various implementations provided below are described with respect to data center 101 and data center 102, the same implementations can also be applied to other data centers (e.g., data center 103).

Data center 101 can include pod units 1A-2A, a common database (DB) 107A, a message storage system (MSS) 111A, a router 113A, and a GUD 115A. Additional pod units also can be included in data center 101, and arranged in a similar manner to the pod units already shown in data center 101.

Similarly, data center 102 can include pod units 1B-2B, a common database (DB) 107B, a message storage system (MSS) 111B, a router 113B, and a GUD 115B. Additional pod units also can be included in data center 102, and arranged in a similar manner to the pod units already shown in data center 102.

Data center 101 and data center 102 can provide backup and redundancy to one another in an event that one of the data centers 101/102 (or one of the components within a data center 101/102) fails. In some implementations, data centers 101 and 102 can be located in different geographic locations or regions to decrease the likelihood that both data centers 101/102 would fail at the same time.

As previously described, each pod unit 1A/2A/1B/2B can function as a subsystem to serve a subset of users of the communication system 100. Each pod unit 1A/2A/1B/2B can include one or more communication servers 119 to provide substantially the same service(s) to the same subset of users as the other pod unit(s) within the same pod. For example, pod unit 1A can include one or more communication servers 119a; pod unit 1B can include one or more communication servers 119b; pod unit 2A can include one or more communication servers 119c; and pod unit 2B can include one or more communication servers 119d.

The communication servers 119 can provide telecommunication services, such as, without limitation, voice, video, email, and facsimile communications to the subset(s) of users. The communication servers 119 can also provide other services such as web-based services (e.g., user account management and configuration), billing services, and other accounting or web-related services. The communication servers 119 can include one or more networked computers with applications, application servers, or components installed that provide services to various client devices such as communication devices 143A-143D. The communication servers 119, in some implementations, can be dedicated to the subset of users for that particular pod unit. The communication servers 119 can also establish outbound calls 120 and communicate over network 117 without going through the router 113A/113B.

Each pod unit 1A/2A/1B/2B can also include an account database 121 to support the communication servers 119 for that particular pod unit. For example, pod unit 1A can include an account database 121a to support the communication servers 119a; pod unit 1B can include an account database 121b to support the communication servers 119b; pod unit 2A can include an account database 121c to support the communication servers 119c; and pod unit 2B can include an account database 121d to support the communication servers 119d. As discussed above, the account database 121a-121d can store configuration details and other information regarding each user's account. The communication servers 119a-119d can also write to the account databases 121a-121d to change information associated with a user account. For example, while fulfilling a service request 131A/131B, the communication servers 119a-119d can update or change information in the account database 121a-121d. As another example, if the service request 131A/131B includes a user changing details of their account (e.g. by accessing an online website for their account), then the communication servers 119a-119d will update the account database 121a-121d accordingly.

Pod unit 1A and pod unit 1B can be in communication with one another so that the data on their respective account databases 121a-121b can be synchronized with one another across data centers. Pod unit 2A and pod unit 2B can also be in communication with one another so that the data on their respective account databases 121c-121d can be synchronized with one another across data centers. Synchronization between the account databases 121a-121d in the pod units 1A/2A/1B/2B can be implemented using commercially available products (e.g., Oracle® Golden Gate), or other database synchronization methods known to one of ordinary skill in the art. All or a portion of the pod units in a pod can be synchronized with one another in this manner.

Data center 101 can include the router 113A to receive an incoming service request 131A from the network 117. The router 113A, in some implementations, can parse the incoming service request 131A from the network 117 to identify or extract a user key (e.g., user key 135 shown in FIG. 1B), and query the GUD 115A to determine which pod is associated with the user key 135. Once the associated pod has been identified by the GUD 115A, the router 113A can route the incoming service request 131A to the identified pod. For example, the router 113A can route the incoming service request 131A to the pod unit (e.g. pod unit 1A or 2A) in the data center 101 associated with the identified pod.

If the pod unit associated with the pod identified by the GUD 115A is neither pod unit 1A nor pod unit 2A of the data center 101, the router 113A can route the service request 131A to another data center (e.g., as indicated by the arrow 141A) which may include the identified pod to support the service request 131A. Based on the pod identified by the GUD 115A, the router 113A can route the service request 131A directly to the pod unit that supports the service request 131A.

Each pod unit 1A and 2A of the data center 101 can also be coupled to the MSS 111A. The MSS 111A can store files for the users served by the pod units 1A and 2A. These files can include messages (e.g., voicemail and facsimiles), user logs, system messages, system and user call prompts (e.g., auto-attendant or user-recorded greetings), and other types of call related or electronic messages. The contents of the MSS 111A can be synchronized with other data centers (e.g., synchronized with MSS 111B of data center 102).

Each pod unit 1A/2A can also be coupled to the common database 107A. The common database 107A can store shared data for all or portions of the pods, and can store consolidated information from the account databases 121 in the pods. The common database 107A can also facilitate changes made to the pod databases. For example, the common database 107A can also store the data for applications that provide the services on the communication servers 119. Different versions of the applications data can be stored in the common database 107A, which allows changes and upgrades to the communication servers 119 to be implemented efficiently and conveniently. Changes can be made to the common databases 107A and can be propagated to the pod units 1A/2A. The common database 107A can also be synchronized across data centers to another common database (e.g., common database 107B of data center 102). Synchronization between the common databases 107A and 107B can be implemented using commercially available products (such as Oracle® Golden Gate), or other database synchronization methods known to one of ordinary skill in the art.

The common database 107A, the MSS 111A, the router 113A, and the GUD 115A form a common layer of resources that can be shared by all the pod units 1A/2A in the data center 101. When a new pod unit is added into the data center 101, the new pod unit can also be connected to the same resources in the common layer as the other existing pod units. In so doing, the common layer can simplify the process of introducing a new pod unit.

The common database 107A can also be synchronized with the account databases 121b and 121d of pod units 1B and 2B associated with data center 102, respectively. Similarly, the common database 107B can be synchronized with the account databases 121a and 121c in pod units 1A and 2A. Synchronization between the common database 107A and account database 121b and 121d, and between the common database 107B and account database 121a and 121c, can be implemented using commercially available products (such as Oracle® Golden Gate), or other database synchronization methods known to one of ordinary skill in the art. While the data center 101 and data center 102 are shown to include the common databases 107, in some implementations, the common database 107 is optional and can be omitted from the data center 101 and/or data center 102. In some implementations, where a plurality of data centers are provided in the communication system 100, only two common databases can be implemented and shared among the plurality of data centers of the communication system 100 so that each data center need not include a common database 107.

Similar to data center 101, data center 102 can also include the router 113B to receive an incoming service request 131B from the network 117. The router 113B can parse the incoming service request 131B to identify or extract a user key (e.g., user key 135 shown in FIG. 1B), and query the GUD 115B to determine which pod is associated with the user key 135. Once the associated pod has been identified by the GUD 115B, the router 113B can route the incoming service request 131B to the identified pod. For example, the router 113B can route the incoming service request 131B to the pod unit (e.g. pod unit 1B or 2B) in the data center 102 associated with the identified pod.

If the pod unit associated with the pod identified by the GUD 115B is neither pod unit 1B nor pod unit 2B of the data center 102, the router 113B can route the service request 131B to another data center (as indicated by the arrow 141B) which may include the identified pod to support the service request 131B. Based on the pod identified by the GUD 115B, the router 113B can route the service request directly to the pod unit that supports the service request 131B.

Each pod unit 1B and 2B of data center 102 can be coupled to the MSS 111B. The message storage system 111B can store files for the users served by pod units 1B and 2B. These files can include messages (e.g., voicemail and facsimiles), user logs, system messages, system and user call prompts (e.g., auto-attendant or user-recorded greetings), and other types of call related or electronic messages. The contents of the MSS 111B can be synchronized with other data centers (e.g., synchronized with MSS 111A of data center 101).

Each pod unit 1B/2B can also be coupled to the common database 107B. The common database 107B can store shared data for all or portions of the pods, and can store consolidated information from the account databases 121 in the pods. The common database 107B can also facilitate changes made to the pod databases. For example, the common database 107B can also store the data for applications that provide the services on the communication servers 119. Different versions of the applications data can be stored in the common database 107B, which allows changes and upgrades to the communication servers 119 to be implemented efficiently and conveniently. Changes can be made to the common databases 107B and can be propagated to the pod units 1B/2B. The common database 107B can also be synchronized across data centers to another common database (e.g., common database 107A of data center 101).

The common database 107B, the MSS 111B, the router 113B, and the GUD 115B form a common layer of resources that can be shared by all the pod units 1B/2B in the data center 102. When a new pod unit is added into the data center 102, the new pod unit can also be connected to the same resources in the common layer as the other existing pod units. In so doing, the common layer can simplify the process of introducing a new pod unit. Each data center, in some implementations, can have its own common layer of resources that is shared by all the pod units in the data center.

In some implementations, one pod unit out of the pod can be in active mode, and can be actively receiving service requests from the router 113A/113B, while the other pod unit(s) can be in standby mode. For example, a pod unit in standby mode only receives critical service requests from the router 113A/113B. The GUD 115A/115B can include information on a pod unit and whether it is in active or standby mode. The GUD 115A/115B identifies an active pod unit to the router 113A/113B in response to a query.

The pod unit(s) in standby mode can switch to active mode to receive service requests when the active pod unit becomes unavailable (for example when the active pod unit or the data center where it is located fails or goes offline). A pod unit in standby mode can still be synchronized with an active pod unit in its pod, so that data in the account database of the active pod unit is replicated to the account database in the standby pod unit. A standby pod unit is only receiving critical service requests such that there are relatively few modifications being made to the account database on a standby pod unit and little need for database replication to occur from the standby pod unit to the active pod unit.

A pod unit in standby mode can maintain a minimum level of services that may be critical to operation. For example, in a telecommunications system, the ability to place and receive phone calls can be critical to operation. In this example, the services for placing and receiving phone calls can remain active even though a pod unit is technically in standby mode. These critical services can modify the account database on a standby pod unit in a limited fashion.

In other implementations, more than one pod unit (or all pod units) associated with a pod can be in active mode to receive routed service requests from the router 113A/113B. When multiple pod units within a pod are in active mode, there can be several ways to route incoming service requests. For example, the router 113 can distribute incoming service requests between active pod units. If pod 1 served a subset of users "A", then the router 113 can route incoming service requests for one set of users "X" exclusively to pod unit 1A, and incoming services requests for another set of users "Y" exclusively to pod unit 1B, where X+Y=A. Both pod units 1A and pod units 1B can each be capable of serving the subset of users "A", but the router 113 distributes incoming service requests between the two pod units 1A/1B. The GUD 115A/115B can be updated to include routing instructions that identify which of the active pod units 1A/1B the router 113 should route the incoming server request. As another example, both pod units 1A/1B can be in active mode and serve incoming service requests, and the determination as to which pod unit 1A/1B should receive the incoming service request is based upon criteria such as, without limitation, the load served by each pod unit 1A/1B, the geographical location of the pod unit 1A/1B, and the response time of each pod unit 1A/1B.

In some implementations, a domain name server (DNS) 145 within the network 117 can be included to determine which data center 101/102 to send the incoming service requests 131A/131B. Each router 113A/113B can be assigned with an individual IP address, and the domain name server 145 can route the incoming service requests 131A/131B to the appropriate router corresponding to the assigned IP address. The DNS 145 can be a part of the communication system 100 (e.g. run by a same service provider), or can be managed by a third-party service or network. In some implementations, the DNS 145 can keep track of the response time of each router 113A/113B or data center 101/102, and distribute the incoming service requests 131A/131B accordingly to balance the load between data centers 101/102 in the communication system 100.

In some implementations, the data center 101/102 selected by the DNS 145 to receive the incoming service requests 131A and/or 131B can be predetermined by the proximity between the source device and the data center 101/102. For example, the incoming service request 131A can be placed by a source device that is geographically located closer to data center 101 than to data center 102. In this example, the DNS 145 can route the service request 131A to data center 101 based on the close proximity of the source device to the data center 101. If the source device is closer to data center 102 than to data center 101, then the service request can be routed as service request 131B to data center 102 based on the close proximity of the source device to data center 102.

In some implementations, an incoming service request 131 can be routed based on the load carried by a pod unit 1A/2A/1B/2B. For example, the GUD 115A may indicate that an incoming service request 131A received by the router 113A should be routed to pod 2. Under normal circumstances, the router 113A can route the incoming service request 131A to the local pod unit (e.g., pod unit 2A) in pod 2 associated with data center 101. When the load (e.g. number of service requests, number of processes, or other processing tasks) served by pod unit 2A exceeds a set threshold, the router 113A can route the incoming service request 131A to another pod unit in pod 2 of a different data center (e.g. pod unit 2B in data center 102). If pod unit 2A is unavailable (e.g. offline for service or maintenance, or operational failure), the router 113A can route the service request 131A to a different data center that also includes a pod unit from pod 2. In some implementations, the router 113A can balance the load by distributing and routing incoming service requests 131A among the different pod units in the same pod (e.g., among pod units 1A and 1B of pod 1 or pod units 2A and 2B of pod 2).

In some implementations, service requests made from one user in the communication system to another user of the same communication system can be routed internally. For example, if an outgoing phone call is made from the communication servers 119 to another user of the same communication system 100, the outgoing phone call can be routed within the communication system 100 to the appropriate pod and pod unit where the destination user receives services, without sending the phone call to an external network.

GUD Implementation

Figure 3A:
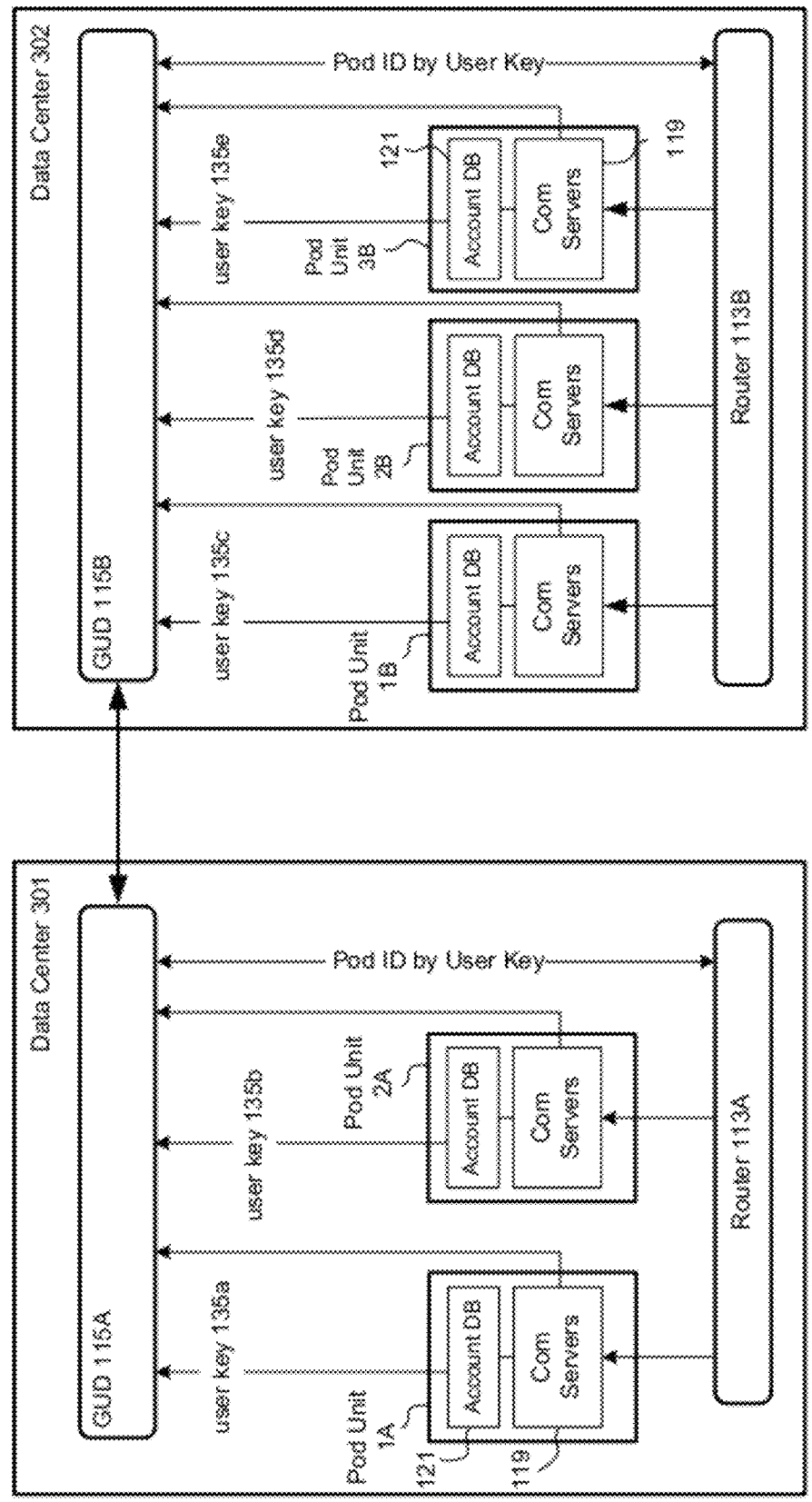
FIG. 3A shows an example of a global user directory (GUD).

FIG. 3A shows an example of a GUD (e.g., GUD 115A/115B). Data center 301 can include one or more pod units from pod 1 and pod 2 (e.g., pod unit 1A and pod unit 2A). Data center 302 can include one or more pod units from pod 1, pod 2, and pod 3 (e.g., pod unit 1B, pod unit 2B, and pod unit 3B). Pod units 1A and 1B are associated with the same pod (e.g., pod 1); pod units 2A and 2B are associated with the same pod (e.g., pod 2); and pod unit 3B is associated with a third pod (e.g., pod 3).

In data center 301, the account database 121 in each pod unit 1A/2A can provide the values associated with the user keys 135a-135b to the GUD 115A. Any changes to the value of any user keys 135a-135b (e.g. user identifiers, phone numbers, device identifiers, email addresses, or other similar parameters) in the account databases 121 can also be transmitted to the GUD 115A. The router 113A can be in communication with the local GUD 115A and can query the GUD 115A for the pod identifier (ID) associated with a user key identified or extracted from an incoming service request. If the local GUD 115A is unavailable, the router 113A can communicate with another GUD in another data center (e.g. GUD 115B in data center 302) as a backup. In some implementations, the communication servers 119 in pod unit 1A/2A can also read and write to the values associated with the user keys 135a-135b in the GUD 115A, for example when applications running on the communication servers 119 need read/write access to the user keys 135a-135b. In some implementations, the local GUD 115A can be implemented with a server or any number of servers in the data center 301.

Similarly, in data center 302, the account database 121 in each pod unit 1B/2B/3B can provide the values associated with the user keys 135c-135e to the GUD 115B. Any changes to the value of any user keys 135c-135e (e.g. user identifiers, phone numbers, device identifiers, email addresses, and other similar parameters) in the account databases 121 can be transmitted to the GUD 115B. The router 113B can be in communication with the local GUD 115B and can query the GUD 115B for the pod ID associated with a user key identified or extracted from an incoming service request. If the local GUD 115B is unavailable, the router 113B can communicate with another GUD in another data center (for example GUD 115A in data center 301) as a backup. In some implementations, the communication servers 119 in pod unit 1B/2B/3B can also read and write to the values associated with the user keys 135c-135e in the GUD 115B (e.g., when applications running on the communication servers 119 need read/write access to the user keys 135c-135e). In some implementations, the local GUD 115B can be implemented with a server or any number of servers in the data center 302.

The GUDs 115A/115B can be implemented as an application running on the server(s) in each data center, and the routers 113A/113B can include clients that query the GUDs 115A/115B. The GUD application can store the user keys 135a-135e and corresponding pod identifiers in memory (e.g., cache memory or random access memory (RAM)) to decrease the time needed for the GUD 115A/115B to respond to a query from the router 113A/113B.

The GUDs 115A/115B can be synchronized with each other across the data centers 301/302 so that the user keys 135a-135e can be replicated and synchronized across different data centers. After replication and synchronization, the GUDs 115A/115B in each data center 301/302 can contain the same user keys 135a-135e and respective values. The GUDs 115A/115B and replication and synchronization between the GUDs 115A/115B can be implemented using commercially available products (such as Oracle® Coherence), or other replication and synchronization method known to one of ordinary skill in the art.

In FIG. 3A, data center 302 can include an additional pod unit (e.g., pod unit 3B from pod 3), whereas data center 301 lacks a corresponding pod unit from pod 3. However, where cross-replication is implemented between the GUDs 115A/115B, the GUD 115A can be provided with the user keys 135a-135e from all the available pods, including the user keys 135e from pod 3, even if the data center 301 does not include a pod unit from pod 3, as will be discussed below with respect to FIGS. 4A and 4B.

Figure 3B:
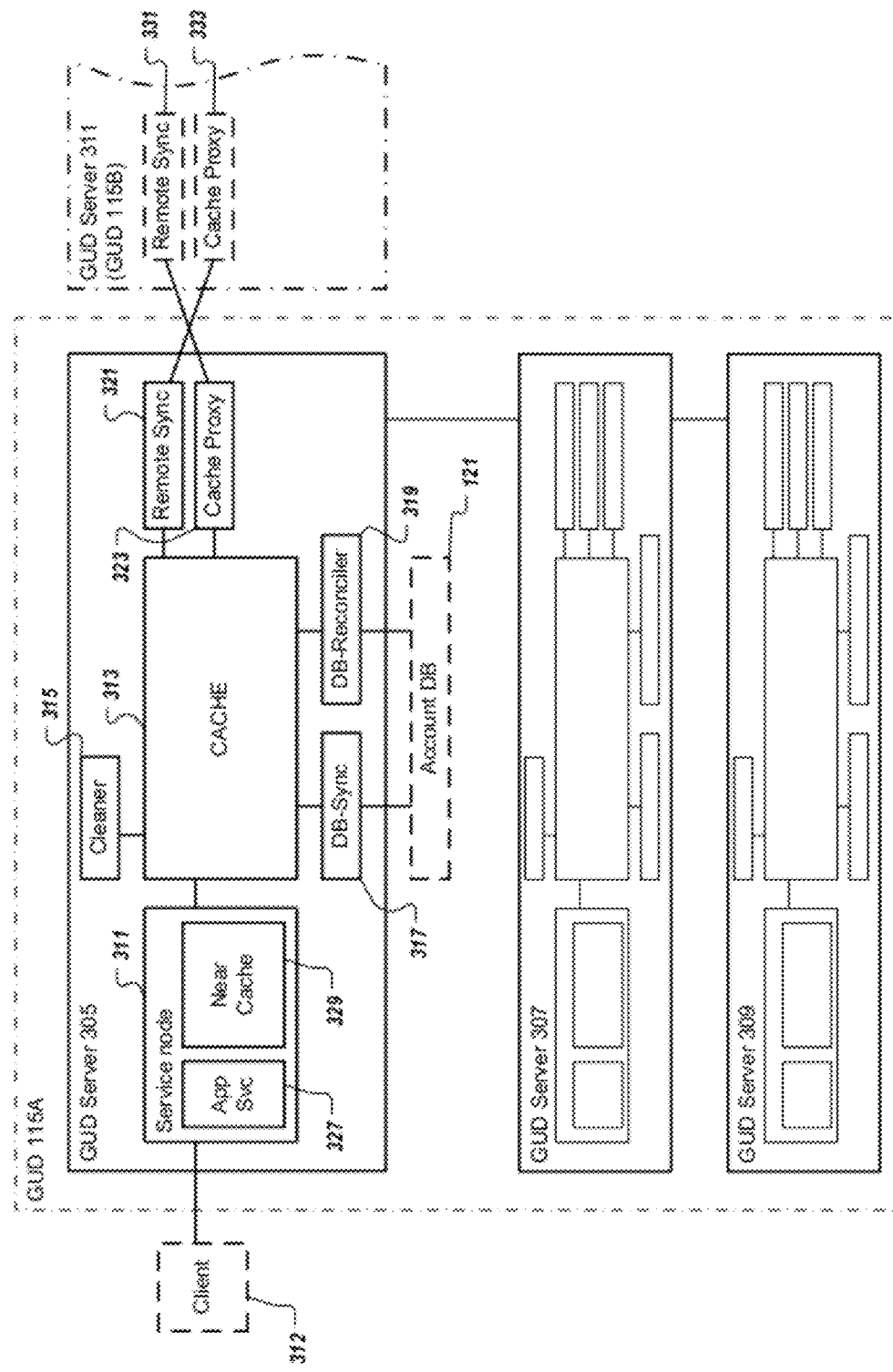
FIG. 3B shows an example architecture of the GUD shown in FIG. 3A.

FIG. 3B shows an example architecture of the GUD (e.g. GUD 115A) shown in FIG. 3A. The GUD 115A can include multiple GUD servers 305, 307, and 309. Three GUD servers are depicted in FIG. 3B, but fewer (e.g. two) or more (e.g. four) GUD servers can be used. Multiple GUD servers can provide reliability and redundancy in case one or more GUD server(s) fail. As shown, the GUD server 305 includes a service node 311, a cache 313, a cleaner 315, a database synchronization module 317, a database reconciler 319, a remote synchronization module 321, a cache proxy 323. GUD servers 307 and 309 can be substantially similar to GUD server 305 and are all in communication with one another.

The service node 311 can include an application service module 327 and a near cache 329. The service node 311 can interact with a client 312 (such as a router 113 or an application running on a communications server 119) to receive a user key and return the corresponding pod identifier. The application service module 327 can manage interactions with the client 312. When the client 312 submits a user key to the application service module 327, the application service module 327 can interface with the cache 313 or the near cache 329 to look up the corresponding pod identifier for the user key. The user keys and their corresponding pod identifiers can be stored in the cache 313. The application service module 327 can return the corresponding pod identifier to the client 312. The near cache 329 can store user keys and corresponding pod identifiers that are frequently used to reduce lookup time for the client 312. Both the cache 313 and the near cache 329 can be implemented using commercially available products (such as Oracle® Coherence), or other replication and synchronization method known to one of ordinary skill in the art.

The database synchronization module 317 can synchronize the user keys in the cache 313 with the databases in the data center. The database reconciler 319 can resolve any differences that may occur during synchronization by the database synchronization module 317. The cleaner 315 can delete user keys that have been marked for deletion in the cache 313.

The cache proxy 323 can be an intermediary between the cache 313 and a component external to the GUD server 305. The remote synchronization module 321 can synchronize the user keys in the cache 313 to the caches of GUDs in other data centers. For example, the remote synchronization module 321 can synchronize the cache 313 to a cache in a GUD of a different data center, such as a GUD server 311 (which is shown only in part in FIG. 3B). The GUD server 311 can be associated with the GUD 115B, which is in a different data center (data center 302) than GUD 115A (which is in data center 301 as shown in FIG. 3A). The remote synchronization module 321 can communicate with a cache proxy 333 of the GUD server 311 to synchronize the caches between GUD server 311 and GUD server 305.

User Key Replication

Figure 4A:
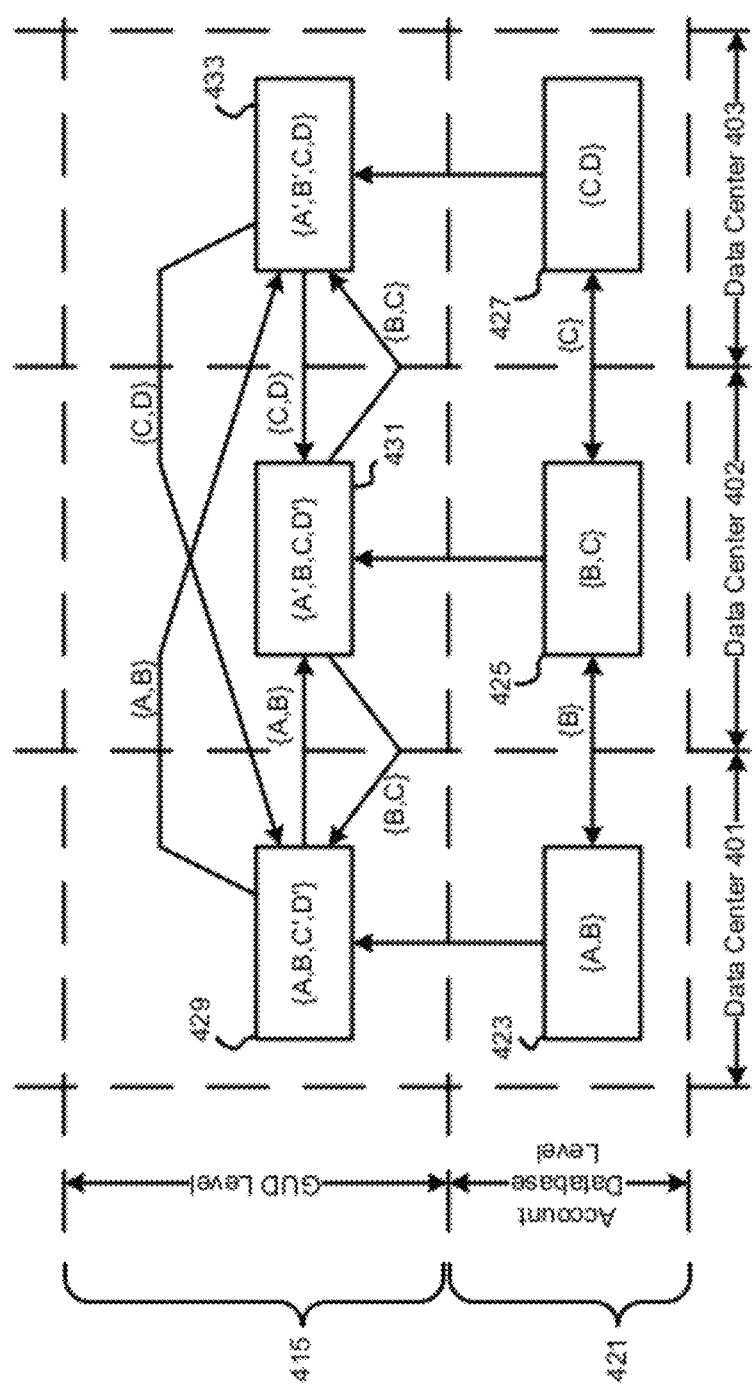
FIG. 4A shows an example of a user key replication between one or more GUDs.

FIG. 4A shows an example of a user key replication between one or more GUDs and one or more account databases. Two different levels of databases are shown; namely, an account database level 421 and a GUD level 415. Within each data center, the account database level 421 can correspond to one or more account databases (e.g., the account databases 121 for the pod units within that data center. The GUD level 415 can correspond to the GUD (e.g., GUD 115A/115B) within a data center (e.g., data center 301/302). In the example shown, three different data centers are provided; namely, data center 401, data center 402, and data center 403.

FIG. 4A also shows four different pods serving four subsets of users A, B, C, and D. A first pod ("pod A") can serve a subset of users A; a second pod ("pod B") can serve a subset of users B; a third pod ("pod C") can serve a subset of users C; and a fourth pod ("pod D") can serve a subset of users D. The pod units in each of the data centers 401, 402, and 403 come from a different combination of pods. For example, data center 401 can include pod units from pods A and B. As another example, data center 402 can include pod units from pods B and C. As yet another example, data center 403 can include pod units from pods C and D.

The account databases in each data center can store user keys for the subset of users served by the pods in the data center. For example, the account databases 423 can store user keys associated with the subsets of users A and B (e.g., designated as {A,B} in FIG. 4A). Similarly, the account databases 425 can store user keys associated with the subsets of users B and C (e.g., designated as {B,C} in FIG. 4A). Also, the account databases 427 can store user keys associated with the subsets of users C and D (e.g., designated as {C,D} in FIG. 4A).

At the account database level 421, account databases 423 and account databases 425 can synchronize user key set {B} with one another, and account databases 425 and account database 427 can synchronize user key set {C} with one another. In some implementations, at the account database level 421, the account databases 423-427 can store only the user keys for the users served by the pod units within its own data center.

In data center 401, the account databases 423 can provide and synchronize user key sets {A,B} to the GUD 429. In data center 402, the account databases 425 can provide and synchronize user key sets {B,C} to the GUD 431. In data center 403, the account databases 427 can provide and synchronize user key sets {C,D} to the GUD 433.

At the GUD level 415, all user key sets can be synchronized and replicated across all GUDs, regardless of which user key sets are stored at the corresponding account database level 421. Various replication paths for the user key sets between the GUDs are shown in FIG. 4A. For example, GUD 429 in data center 401 can synchronize and replicate the user key set {A,B} with GUD 431 and GUD 433. As another example, GUD 431 in data center 402 can synchronize and replicate the user key set {B,C} with GUD 429 and GUD 433. As yet another example, GUD 433 in data center 403 can synchronize and replicate the user key set {C,D} with GUD 429 and GUD 431.

Figure 4B:
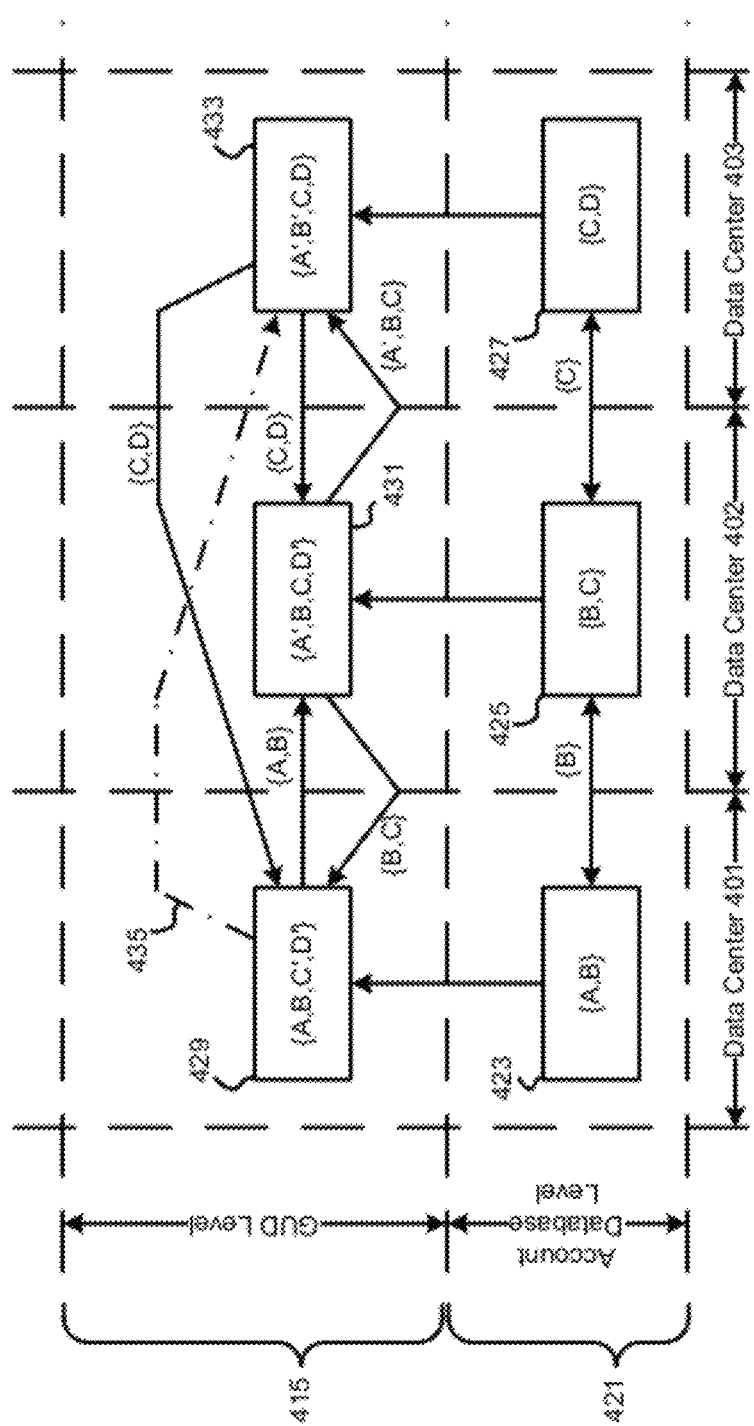
FIG. 4B shows an example of a user key relay replication.

When a replication path is unavailable (due to planned or unplanned downtime), the user key sets can be replicated across the GUDs using relay replication. FIG. 4B shows an example of a user key relay replication.

Referring to FIG. 4B, the direct replication path between GUD 429 in data center 401 and GUD 433 in data center 403 is unavailable (as represented by a dashed line 435 instead of a solid line), so user key set {A,B} cannot be replicated directly from GUD 429 to GUD 433. With relay replication, the user key set {A,B} can be replicated through an intermediate GUD, such as GUD 431. The replication path from GUD 429 to GUD 431 remains available, so GUD 431 can receive the user key set {A,B} from the GUD 429. Then, GUD 431 can relay the user key set {A', B, C} to GUD 433. Thus, GUD 433 can receive its copy of the user key set {A'} via relay replication from the intermediate GUD 431.

The end result of the sharing and replication at the GUD level 415 is that each GUD can be provided with every available user key set in the communication system. For example, GUD 429 can include user key sets {A,B} that originate from the pods served by data center 401. In this example, GUD 429 can also include user key sets {C',D'} that are replicated from pods not served by data center 401. For illustrative purposes, the prime symbol (') after a user key set in the GUD indicates that the user key set originates from a pod not served by the associated data center. Similarly, GUD 431 can include user key sets {B,C} from the pods within its data center 402 as well as user key sets {A',D'} from pods outside of data center 402. GUD 433 also can include user key sets {C, D} from the pods within the data center 403 as well as user key sets {A',B'} from pods outside of data center 403.

When every GUD in every data center is provided with all available user key sets, an incoming service request can be routed to the proper data center regardless of which data center first receives the service request.

Exemplary Method for User Partitioning in a Communication System

Figure 5:
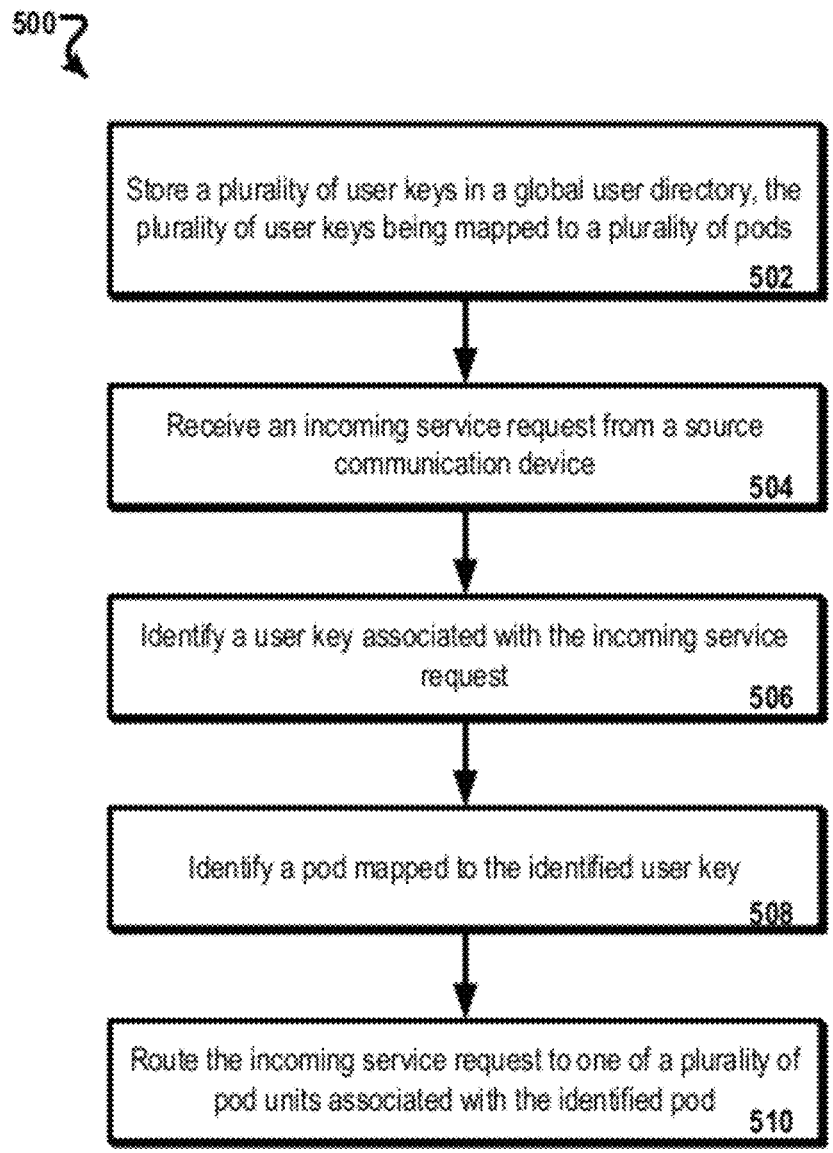
FIG. 5 shows an example of a user partitioning process.

FIG. 5 shows an example of a user partitioning process.

At 502, a plurality of user keys can be stored in a GUD. In some implementations, the plurality of user keys can be mapped to a plurality of pods, and each pod can serve a subset (or subsets) of user accounts associated with a hosted PBX system.

At 504, an incoming service request can be received. In some implementations, the incoming service request can originate from a source communication device. In some implementations, the incoming service request can be formatted according to various packet-based protocols, including, without limitation, SIP, HTTP, SMTP, POP3, and SOAP.

At 506, a user key can be identified or extracted from the incoming service request. In some implementations, the user key can include an identifier that uniquely identifies a user account associated with the incoming service request.

At 508, the pod mapped to the identified or extracted user key can be identified. In some implementations, each user key can be mapped to at least one pod that serves the user account associated with the user key.

At 510, the incoming service request can be routed to one of a plurality of pod units within the identified pod. In some implementations, each pod unit can be located in a different data center, and each pod unit can serve the source communication device.

Operations 502-510 can be performed in the order listed, or in parallel (e.g., by the same or a different process, substantially or otherwise non-serially).

Exemplary Failover Scenario Between Pod Units

Figure 7:
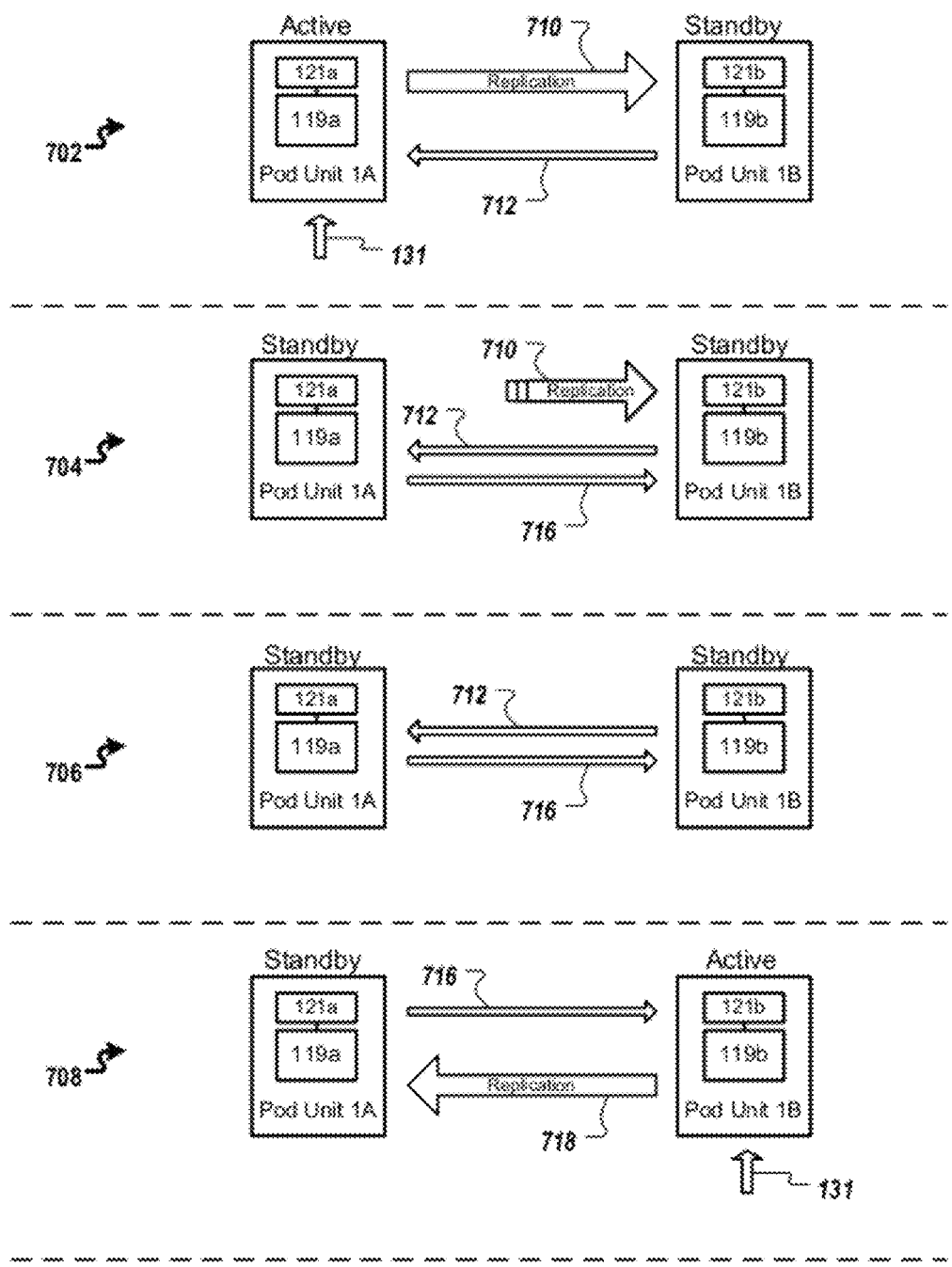
FIG. 7 shows an example of a failover scenario between pod units in a same pod.

FIG. 7 shows an example of a failover scenario between pod units in the same pod. For example, pod unit 1A and pod unit 1B can be two different pod units associated with the same pod, and can be located in two different data centers. As shown, pod unit 1A includes an account database 121a and communication server 119a, and pod unit 1B includes an account database 121b and communication server 119b.

FIG. 7 shows four different stages (702, 704, 706, and 708) in the failover scenario between pod unit 1A and pod unit 1B. In some implementations, the scenario described hereinbelow is applicable when access to the account database 121a is maintained, and replication pathways and controls remain available, and is not applicable when the account database 121a is not available (e.g. when there is a catastrophic failure of the account database 121a or of the data center where pod unit 1A is located).

At stage 702, pod unit 1A is in active mode and is actively receiving incoming service requests 131 from a router (not shown). An arrow 710 represents the replication of account database 121a from pod unit 1A to the account database 121b in pod unit 1B. As previously described, synchronization between account databases 121a and 121b can be implemented using commercially available products (e.g., Oracle® Golden Gate), or other database synchronization methods known to one of ordinary skill in the art.

Pod unit 1B is in standby mode and is generally not receiving any incoming service requests from the router. However, the pod unit 1B can, in some implementations, maintain a minimum level of services that may be critical to operation. For example, there may be a relatively small level of replication (represented by arrow 712) from account database 121b to account database 121a as a result of this minimum level of critical services.

At stage 704, pod unit 1A transitions to a standby mode so that pod unit 1A no longer receives incoming service requests. The GUD is updated to indicate that pod unit 1A is no longer running in active mode. Pod unit 1B remains in standby mode. Thereafter, pod units 1A/1B can wait for the replication 710 that had been initiated during stage 702 to finish, so that conflicts between the databases 121a and 121b do not develop as a result of incomplete replication during failover. Pod units 1A/1B can maintain a minimum level of services that may be critical to operation (e.g. placing and receiving phone calls). For example, there may be a relatively small level of replication (represented by arrow 712) from account database 121b to account database 121a as a result of this minimum level of critical services. There may also be a relatively small level of replication (represented by arrow 716) from account database 121a to account database 121b as a result of this minimum level of critical services. In some implementations, stage 704 can last for a relatively short amount of time, since both pod units 1A/1B are in standby mode and only provide a minimum level of services.

At stage 706, the replication 710 is completed. At stage 708, pod unit 1B transitions into active mode and actively receives incoming services requests 131 from the router. The GUD is updated to indicate that pod unit 1B is now running in active mode. Pod unit 1A remains in standby mode, as a small level of replication 716 from database 121a to database 121b remains due to any critical services still running on pod unit 1A.

If the account database 121a is not available, for example when there is a catastrophic failure of the account database 121a or of the data center where pod unit 1A is located, then a manual shutdown of the account database 121a may be necessary. Any replication 710 that may have been in process is terminated and pod unit 1B can be switched into active mode without a waiting stage (such as in stage 704) for replication to finish. Once the account database 121a is restored, replication can be reestablished and any discrepancies between 121a and 121b will need to be resolved.

Exemplary Method for Failover Between Pod Units

Figure 8:
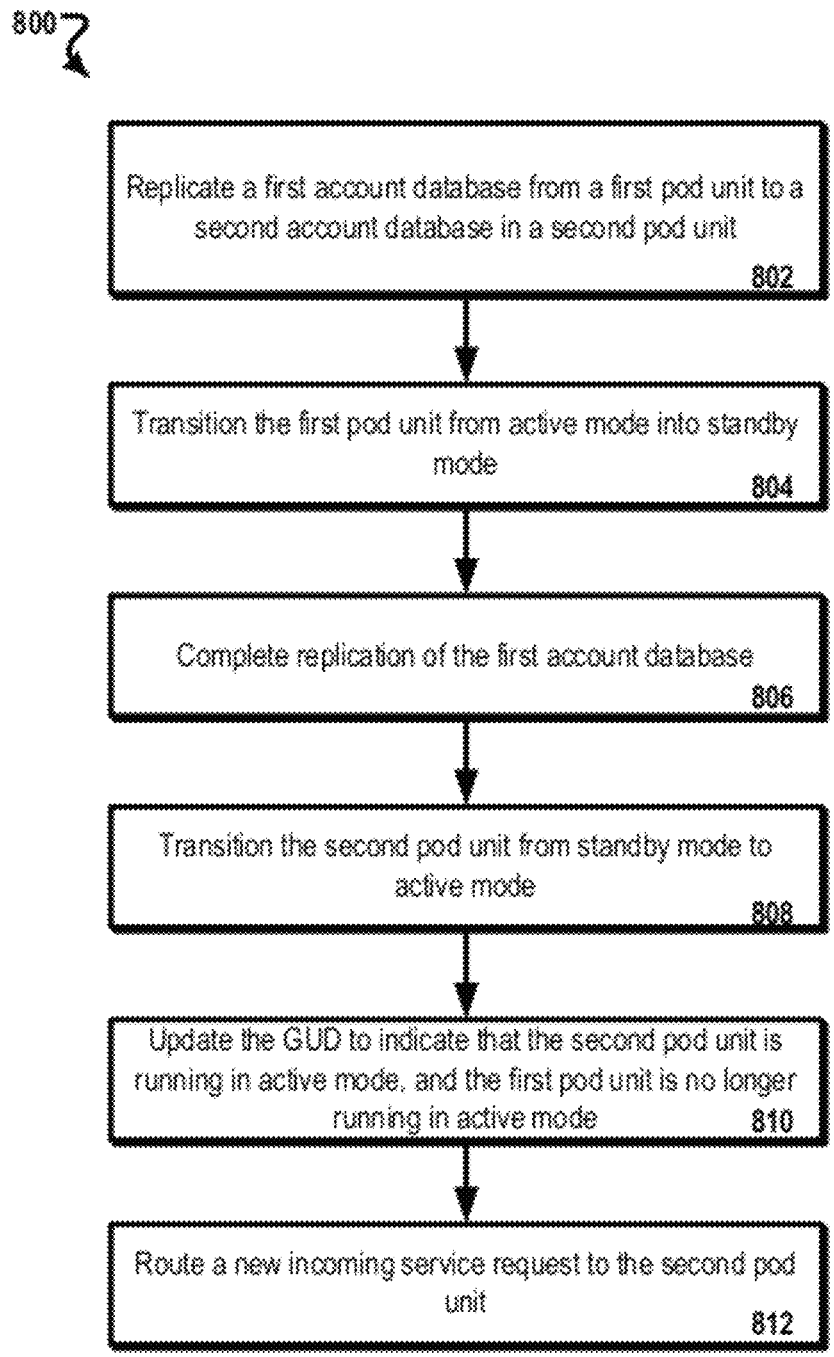
FIG. 8 shows an example of a failover process.

FIG. 8 shows an example of a failover process. At 802, a first account database can be replicated. In some implementations, the first account database can be replicated from a first pod unit to a second account database in a second pod unit. The first pod unit can be running in active mode and the second pod unit can be running in standby mode.

At 804, the first pod unit can be transitioned from active mode into standby mode. In some implementations, the first pod unit can be transitioned into standby mode before replication of the first account database is complete. The first pod unit and the second pod unit can maintain a minimum level of services that may be critical to operation.

At 806, replication of the first account database can be completed. In some implementations, a small level of replication resulting from maintaining a minimum level of critical services can still occur between the account databases of the first and second pod units.

At 808, the second pot unit can be transitioned from standby mode to active mode.

At 810, the GUD can be updated to indicate that the second pod unit is running in active mode, and the first pod unit is no longer running in active mode. The router can route incoming service requests to the second pod unit.

At 812, a new incoming service request can be routed to the second pod unit.

Exemplary System and Method for Migrating Users Between Pods

User partitioning of the communication system into pods can facilitate migration of users between pods. Migration of users may be necessary when an application running on a communication server needs to be changed to a different version (e.g. upgraded from an older version of the application to a new version).

Figure 9A:
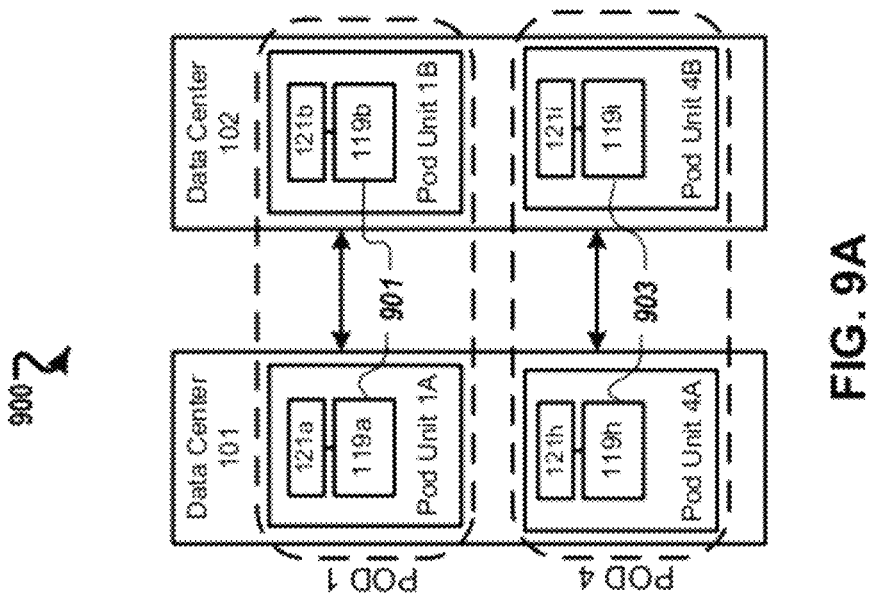
FIG. 9A shows an exemplary communication system for migrating users between pods.

FIG. 9A shows an exemplary communication system 900 for migrating users between pods. The communication system 900 can include a data center 101 and a data center 102. Each data center 101/102 can include the common layer of resources previously described including a router, common database, message storage system, and GUD, which were already described with respect to FIG. 2 and are not shown here. The communication system 900 can have two pods: pod 1 and pod 4. Pod 1 can serve a subset of users "A". Pod 1 can include a pod unit 1A in the data center 101 and a pod unit 1B in the data center 102. Pod unit 1A can have an account database 121a and a communication server 119a. Pod unit 1B can have an account database 121b and a communication server 119b. The communication servers 119a/119b can be installed with an application 901. The application 901 can be any application (e.g., software) providing a service to a source device; for example, the application can be a voice-over-IP (VOIP) application that provides voice services to a source device.

Pod 4 can include a pod unit 4A in the data center 101 and a pod unit 4B in the data center 102. Pod unit 4A can have an account database 121h and a communication server 119h. Pod unit 4B can have an account database 121i and a communication server 119i. The communication servers 119h/119i can be installed with an application 903, which can be, in some implementations, a different version of the application 901. For example, it can be a newer version of the VOIP application installed on communication servers 119a/119b. Initially, pod units 4A and 4B are not in active mode and do not serve any actual user accounts of the communication system 900. Pod units 4A and 4B are run initially in a test mode only, to test the application 903 within the communication system 900. Test accounts instead of actual user accounts can also be created for the test mode, and test data for the test accounts generated to populate the account databases 121h/121i. Once the application 903 has been verified to operate properly within the communication system, the data (e.g. the data in account databases 121a/121b, files in the MSS, the GUD) for the subset of users "A" can be copied over from pod 1 to pod 4. After the user data has been copied over to pod 4, pod 1 can be inactivated, and pod 4 can be switched to run in active mode.

Figure 9B:
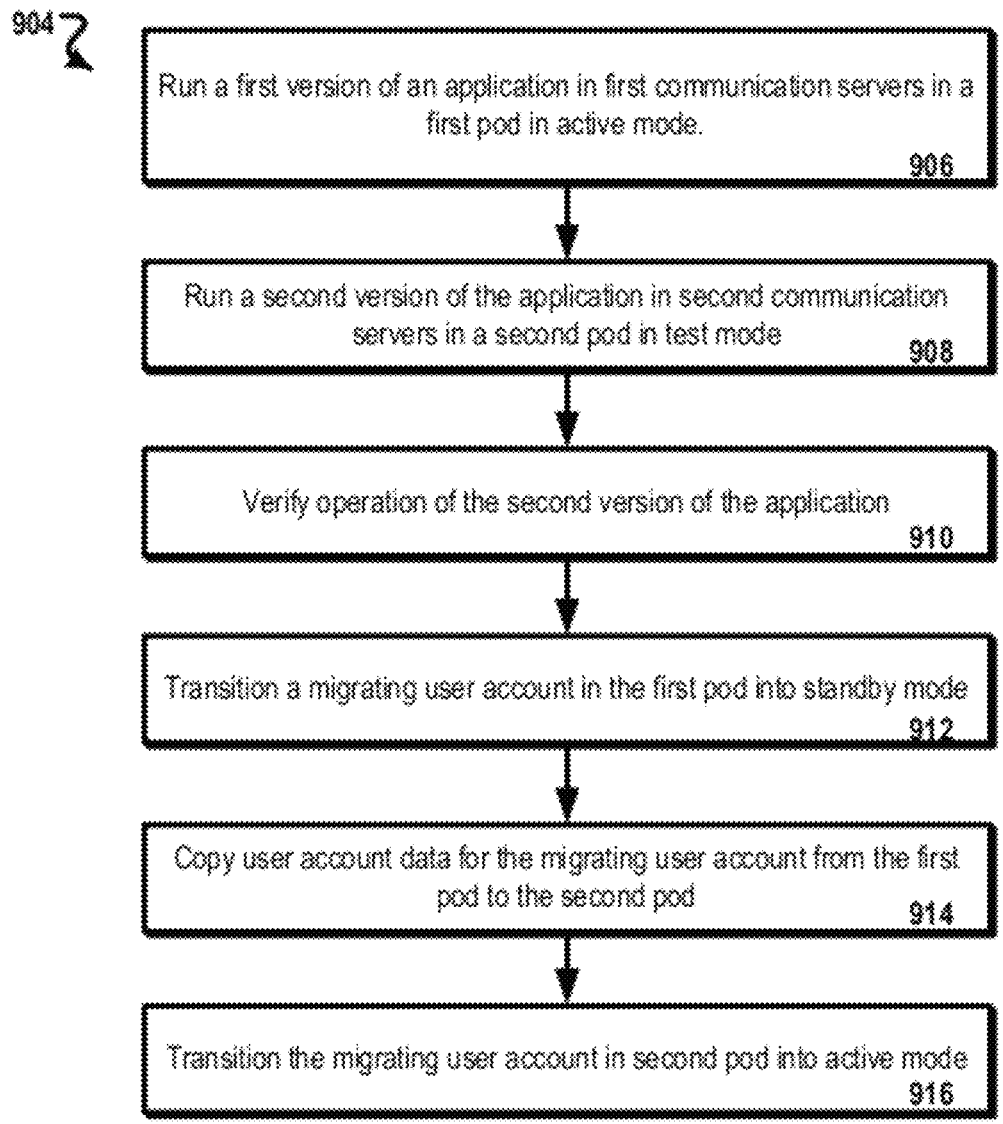
FIG. 9B shows an example of a process for migrating users between pods.

FIG. 9B shows an example of a process 904 for migrating users between pods. At 906, a first version of an application can be run in a first pod. The first version of the application can be installed on communication servers in the first pod. The first pod can be operating in active mode, meaning at least one pod unit within the first pod is actively receiving incoming service requests from a router.

At 908, a second version of the application can be run in a second pod. The second version of the application can be installed on communication servers in the second pod. The second pod can be operating in test mode. In test mode, the second pod does not serve any actual users of the communication system, and pod units within the second pod do not receive or serve incoming service requests. In some implementations, account databases within the second pod store test account data and not actual account data.

At 910, operation of the second version of the application can be verified. Tests can be run to ensure that the second version of the application is operating properly within the communication system.

At 912, one or more user account(s) can be selected for migration from the first pod and can be transitioned into standby mode. The GUD can be updated to reflect the standby status of the selected user account. When a user account is in standby mode, changes to the corresponding data in the account databases are limited. Only critical incoming service requests can be processed by the first pod for a user account in standby mode.

At 914, user account data for the migrating user account(s) can be copied from the first pod to the second pod. Since the migrating user account(s) is operating in standby mode, changes to user data in the first pod are limited, and the copying from the first pod to the second pod can be accomplished with relatively low risk of user data changing and creating a conflict during the copying process.

At 916, the selected user account(s) in the second pod can be transitioned into active mode. The GUD can be updated to indicate that the selected user account(s) in the second pod is operating in active mode, so incoming service requests can be routed to the second pod. In this manner, migration of users from the first pod to the second pod can be completed. The selected user account can be removed from the first pod once migration and operation of the user account in the second pod is verified.

Exemplary Computing Device

Figure 6:
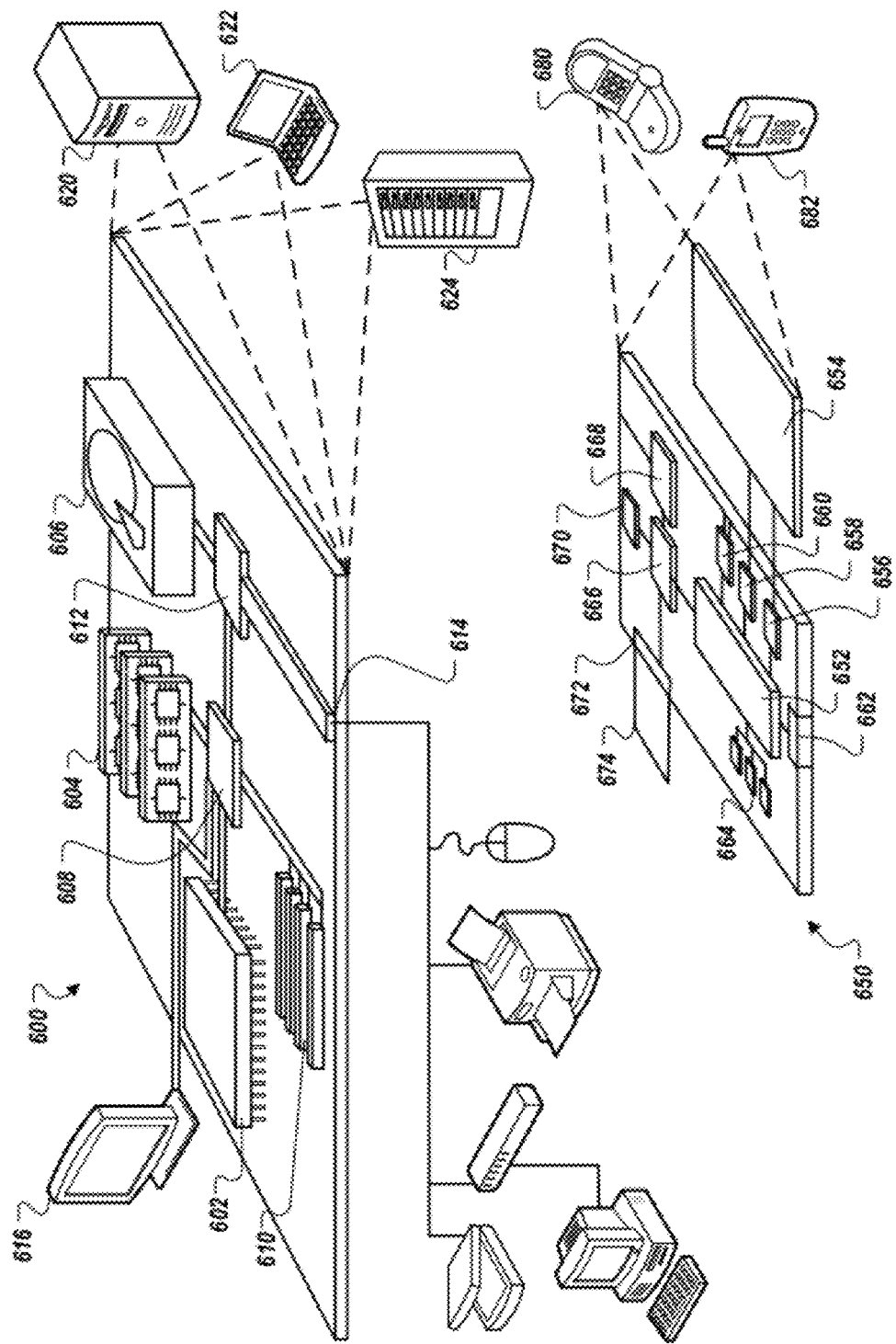
FIG. 6 shows an example of a computing device that can be used to implement various systems and methods described herein.

FIG. 6 is a block diagram of computing devices 600, 650 that can be used to implement the systems and methods described herein, such as the various servers (e.g. communication servers) and routers. Computing device 600 can represent various forms of digital computers, such as laptops, desktops, workstations, personal digital assistants, servers, blade servers, mainframes, and other appropriate computers (e.g., user terminal 126). Computing device 650 can represent various forms of mobile devices, such as personal digital assistants, cellular telephones, smartphones, and other similar computing devices used to place or receive the service requests. The components shown here, their connections and relationships, and their functions, are meant to be exemplary only, and are not meant to limit implementations of the inventions described and/or claimed in this document.

As shown in FIG. 6, computing device 600 can include a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, can be interconnected using various busses, and can be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses can be used, as appropriate, along with multiple memories and types of memory. Also, multiple computing devices 600 can be connected, with each device providing portions of the necessary operations (e.g., as a server bank, a group of blade servers, or a multi-processor system).

The memory 604 stores information within the computing device 600. In one implementation, the memory 604 can be a computer-readable medium. In one implementation, the memory 604 can be a volatile memory unit or units. In another implementation, the memory 604 can be a non-volatile memory unit or units.

The storage device 606 can be configured to provide mass storage for the computing device 600. In one implementation, the storage device 606 can be a computer-readable medium. In various different implementations, the storage device 606 can be a floppy disk device, a hard disk device, an optical disk device, or a tape device, a flash memory or other similar solid state memory device, or an array of devices, including devices in a storage area network or other configurations. In one implementation, a computer program product can be non-transitory, and contain instructions that, when executed, perform one or more methods, such as those described above. The computer program product can be a computer- or machine-readable medium, such as the memory 604, the storage device 606, or memory on processor 602.

The high speed controller 608 can manage bandwidth-intensive operations for the computing device 600, while the low speed controller 612 manages lower bandwidth-intensive operations. Such allocation of duties is exemplary only. In one implementation, the high-speed controller 608 can be coupled to memory 604, display 616 (e.g., through a graphics processor or accelerator), and to high-speed expansion ports 610, which may accept various expansion cards (not shown). In the implementation, low-speed controller 612 can be coupled to storage device 606 and low-speed expansion port 614. The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 600 can be implemented in a number of different forms, as shown in the figure. For example, it can be implemented as a standard server 620, or multiple times in a group of such servers. It can also be implemented as part of a rack server system 624. In addition, it can be implemented in a personal computer such as a laptop computer 622. Alternatively, components from computing device 600 can be combined with other components in a mobile device (not shown), such as device 650. Each of such devices can contain one or more of computing device 600, 650, and an entire system can be made up of multiple computing devices 600, 650 communicating with each other.

Computing device 650 can include a processor 652, memory 664, an input/output device such as a display 654, a communication interface 666, and a transceiver 668, among other components. The device 650 can also be provided with a storage device, such as a microdrive or other device, to provide additional storage. Each of the components 650, 652, 664, 654, 666, and 668, can be interconnected using various buses, and several of the components may be mounted on a common motherboard or in other manners as appropriate.

The processor 652 can process instructions for execution within the computing device 650, including instructions stored in the memory 664. The processor can also include separate analog and digital processors. The processor can provide, for example, for coordination of the other components of the device 650, such as control of user interfaces, applications run by device 650, and wireless communication by device 650.

Processor 652 can communicate with a user through control interface 658 and display interface 656 coupled to a display 654. The display 654 can be, for example, a TFT LCD display or an OLED display, or other appropriate display technology. The display interface 656 can include appropriate circuitry for driving the display 654 to present graphical and other information to a user. The control interface 658 can receive commands from a user and convert them for submission to the processor 652. In addition, an external interface 662 can be provide in communication with processor 652, so as to enable near area communication of device 650 with other devices. External interface 662 can provide, for example, for wired communication (e.g., via a docking procedure) or for wireless communication (e.g., via Bluetooth or other such technologies).

The memory 664 can store information within the computing device 650. In one implementation, the memory 664 is a computer-readable medium. In one implementation, the memory 664 can be a volatile memory unit or units. In another implementation, the memory 664 can be a non-volatile memory unit or units. Expansion memory 674 can also be provided and connected to device 650 through expansion interface 672, which can include, for example, a SIMM card interface. Such expansion memory 674 can provide extra storage space for device 650, or can also store applications or other information for device 650. Specifically, expansion memory 674 can include instructions to carry out or supplement the processes described above, and can include secure information also. Thus, for example, expansion memory 674 can be provided as a security module for device 650, and can be programmed with instructions that permit secure use of device 650. In addition, secure applications can be provided via the SIMM cards, along with additional information, such as placing identifying information on the SIMM card in a non-hackable manner.

The memory can include for example, flash memory and/or MRAM memory, as discussed below. In one implementation, a computer program product can be non-transitory, and contain instructions that, when executed, perform one or more methods, such as those described above. The computer program product can be a computer- or machine-readable medium, such as the memory 664, expansion memory 674, or memory on processor 652.

Device 650 can communicate wirelessly through communication interface 666, which can include digital signal processing circuitry where necessary. Communication interface 666 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 668. In addition, short-range communication can occur, such as using a Bluetooth, WiFi, or other such transceiver (not shown). In addition, GPS receiver module 1270 can provide additional wireless data to device 650, which can be used as appropriate by applications running on device 650.

Device 650 can also communicate audibly using audio codec 660, which can receive spoken information from a user and convert it to usable digital information. Audio codex 660 can likewise generate audible sound for a user, such as through a speaker, e.g., in a handset of device 650. Such sound can include sound from voice telephone calls, can include recorded sound (e.g., voice messages, music files, etc.) and can also include sound generated by applications operating on device 650.

The computing device 650 can be implemented in a number of different forms, as shown in the figure. For example, it can be implemented as a cellular telephone 680. It can also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor. In some implementations, a machine-readable medium can be a non-transitory medium, and can receive machine instructions in the form of a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component, or that includes a front end component (e.g., a client computer having a graphical user interface or a web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the systems and methods have been described, it should be recognized that numerous other applications are contemplated. Accordingly, other embodiments are within the scope of the following claims.

What is claimed is:

1. A communication system, comprising:
a plurality of pods each serving a respective subset of user accounts associated with a hosted private branch exchange (PBX) system;
a global user directory to store a plurality of user keys that are mapped to the plurality of pods; and
one or more processors configured to:
receive a first service request,
determine that the first service request is associated with a first user associated with a first user account in a first subset of user accounts served by a first pod of the plurality of pods, comprising identifying a user key from the first service request and querying the global user directory to identify the first pod as being associated with the identified user key,
based on the determining, route the first service request the first pod,
select the first user account for migration from being served by the first pod to being served by a second pod of the plurality of pods and transitioning the first user account into standby mode,
while the first user account is in standby mode, copy user account data for the first user account from the first pod to the second pod, and
transition the first user account to active mode in the second pod.

2. The communication system of claim 1, wherein the second pod includes a third pod unit having a third communication server in a first data center and a fourth pod unit having a fourth communication server in a second data center, each of the third communication server and the fourth communication server configured to serve a second subset of user accounts.

3. The communication system of claim 2, wherein
the third pod unit is in active mode and configured to receive incoming calls;
the fourth pod unit is in standby mode; and
after migration, the processor is configured to route service requests associated with the first user account to the third pod unit in active mode.

4. The communication system of claim 3, wherein
the fourth pod unit transitions from standby mode to active mode when the third pod unit is unavailable.

5. The communication system of claim 2, wherein the third pod unit and the fourth pod unit are in active mode, and the processor is configured to distribute service requests between the third pod unit and the fourth pod unit based on routing instructions corresponding to the user key stored in the global user directory.

6. The communication system of claim 1, wherein the processor is configured to routes the first service request to a first pod unit in the first pod or a second pod unit in the first pod based on a load associated with the first pod unit or the second pod unit.

7. The communication system of claim 1, wherein the processor is configured to route the first service request to a second pod unit in the first pod when a first pod unit in the first pod is unavailable.

8. The communication system of claim 1, wherein the first pod includes first and second communication servers that are configured to provide voice over internet protocol (VOIP) based services, or facsimile over internet protocol (FOIP) based services, or VOIP and FOIP services.

9. The communication system of claim 1, wherein a first pod unit of the first pod includes a first account database and a second pod unit of the first pod includes a second account database, each of the first account database and the second account database configured to store configuration details associated with the first subset of user accounts.

10. The communication system of claim 9, wherein the first account database and the second account database are synchronized.

11. The communication system of claim 1, the first pod including a first pod unit having a first communication server in a first data center and a second pod unit having a second communication server in a second data center, and the system further comprising:
a first common database in the first data center configured to consolidate account information from all pod units and propagate account information to all pod units; and
a second common database in the second data center configured to consolidate account information from all pod units and propagate account information to all pod units,
wherein the first common database and the second common database are synchronized.

12. The communication system of claim 11, further comprising:
a first message storage system in the first data center configured to store one or more files for all pod units associated with the first data center; and
a second message storage system in the second data center configured to store one or more files for all pod units associated with the second data center,
wherein the first message storage system and the second message storage system are synchronized.

13. The system of claim 1, wherein the first pod comprises first communication servers running a first version of an application, the first pod operating in active mode, and wherein the second pod comprises second communication servers running a second version of the application in test mode.

14. The system of claim 13, wherein the processor is configured to select the first account for migration in response to verifying operation of the second version of the application.

15. A method comprising:
storing, in a global user directory (GUD), a plurality of user keys that are mapped to a plurality of pods, each pod serving a subset of user accounts associated with a hosted private branch exchange (PBX) system;
receiving an incoming call from a source communication device;
determining that the call is intended for a first user associated with a first user account in a first subset of user accounts associated with a first pod, comprising:
identifying a user key from the incoming call; and
querying the GUD to identify a pod mapped to the identified user key;
routing the incoming call to the first pod based on the determining;
selecting the first user account for migration from being served by the first pod to being served by a second pod of the plurality of pods and transitioning the first user account into standby mode;
while the first user account is in standby mode, copying user account data for the first user account from the first pod to the second pod; and
transitioning the first user account to active mode in the second pod.

16. The method of claim 15, wherein routing the incoming call includes:
identifying a pod unit running in active mode from among a plurality of pod units in the first pod; and
routing the incoming call to the pod unit running in active mode.

17. The method of claim 15, further comprising:
replicating a first account database from a first pod unit in the first pod to a second account database in a second pod unit in the first pod, wherein the first pod unit is running in active mode and the second pod unit is running in standby mode;
transitioning the first pod unit from active mode into standby mode;
completing replication of the first account database;
transitioning the second pod unit from standby mode to active mode;
updating the GUD to indicate that the second pod unit is running in active mode, and the first pod unit is no longer running in active mode; and
routing a new incoming service request to the second pod unit.

18. The method of claim 15, wherein routing the incoming call includes:
determining a load carried by a first pod unit in the first pod; and
routing the incoming call to a second pod unit in the first pod when the load carried by the first pod unit exceeds a predetermined threshold.

19. The method of claim 15, further comprising:
replicating the user key across a plurality of GUDs in a plurality of data centers, including replicating the user key over one or more replication paths between each of the plurality of GUDs, and wherein a relay replication path including at least one intermediate GUD between a pair of GUDs can be used when one of the replication paths is unavailable.

20. The method of claim 15, wherein the first pod comprises first communication servers running a first version of an application, the first pod operating in active mode, and wherein the second pod comprises second communication servers running a second version of the application in test mode.

21. The method of claim 20, further comprising selecting the first account for migration in response to verifying operation of the second version of the application.

* * * * *

UNITED STATES PATENT AND TRADEMARK OFFICE
CERTIFICATE OF CORRECTION

| | | |
|---|---|---|
| PATENT NO. | : 8,787,367 B2 | Page 1 of 1 |
| APPLICATION NO. | : 12/957125 | |
| DATED | : July 22, 2014 | |
| INVENTOR(S) | : Vlad Vendrow et al. | |

It is certified that error appears in the above-identified patent and that said Letters Patent is hereby corrected as shown below:

In the Claims

Column 21, line 22, Claim 1: delete "request" and insert --request to--; and

Column 21, line 57, Claim 6: delete "routes" and insert --route--.

Signed and Sealed this
Eleventh Day of November, 2014

Michelle K. Lee
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,787,367 B2 |
| APPLICATION NO. | : 12/957125 |
| DATED | : July 22, 2014 |
| INVENTOR(S) | : Vlad Vendrow et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 347 days.

Signed and Sealed this
Eighth Day of March, 2016

Michelle K. Lee
*Director of the United States Patent and Trademark Office*